United States Patent
Rupprath et al.

(10) Patent No.: US 9,061,774 B2
(45) Date of Patent: Jun. 23, 2015

(54) ADAPTER CIRCUIT

(71) Applicant: Hella KGaA Hueck & Co., Lippstadt (DE)

(72) Inventors: Bernhard Rupprath, Lippstadt (DE); Klaus-Peter Schmitz, Lippstadt (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 0 days.

(21) Appl. No.: 14/155,966

(22) Filed: Jan. 15, 2014

(65) Prior Publication Data

US 2014/0197970 A1 Jul. 17, 2014

(30) Foreign Application Priority Data

Jan. 15, 2013 (EP) ..................... 13151258

(51) Int. Cl.
  *B64F 1/20* (2006.01)
  *H05B 33/08* (2006.01)
(52) U.S. Cl.
  CPC .............. *B64F 1/20* (2013.01); *H05B 33/0815* (2013.01); *Y02B 20/346* (2013.01)
(58) Field of Classification Search
  USPC .......................... 340/953–956, 958, 959, 980; 315/246–287, 291, 308; 307/132 E, 307/132 EA, 139, 142; 361/819
  See application file for complete search history.

(56) References Cited

U.S. PATENT DOCUMENTS

| 5,993,039 A | * | 11/1999 | Crill ................................. 700/79 |
| 6,040,969 A | * | 3/2000 | Winch et al. .................... 361/82 |
| 8,264,806 B2 | * | 9/2012 | Gehrke ........................ 361/91.1 |
| 2004/0263090 A1 | * | 12/2004 | Erlbacher et al. .......... 315/241 P |
| 2009/0091268 A1 | * | 4/2009 | Forssen et al. ................ 315/250 |
| 2012/0133203 A1 | * | 5/2012 | Lienkamp et al. ............. 307/9.1 |
| 2013/0082611 A1 | * | 4/2013 | Cohen ....................... 315/185 R |

FOREIGN PATENT DOCUMENTS

| EP | 2048917 A1 | 4/2009 |
| WO | 2009074913 A1 | 6/2009 |

* cited by examiner

*Primary Examiner* — Brian Zimmerman
*Assistant Examiner* — Laura Nguyen
(74) *Attorney, Agent, or Firm* — Husch Blackwell LLP; Samuel Digirolamo; Daniel S. Cohn

(57) ABSTRACT

An adapter circuit for connecting a switching circuit of an airport visual aid is equipped with an LED as a light source and a secondary-side coil (secondary side) of a supply transformer, wherein at least one switch element is provided for selectively making or breaking the connection and wherein at least one trigger circuit is provided for actuating the switch element when a specified voltage level is exceeded, wherein the switch element is provided between the trigger circuit and the secondary side of the supply transformer and/or the trigger circuit is connected to the switch contact and to the switching circuit of the LED airport visual aid.

9 Claims, 4 Drawing Sheets

ADAPTER CIRCUIT

CROSS REFERENCE

This application claims priority to European Patent Application No. 13151258.4, filed Jan. 15, 2013.

TECHNICAL FIELD OF THE INVENTION

The invention relates to an adapter circuit for connecting a switching circuit of an airport visual aid that is equipped with an LED as a light source and a secondary-side coil (secondary side) of a supply transformer, wherein at least one switch element is provided for selectively making or breaking the connection and wherein at least one trigger circuit is provided for actuating the switch element when a specified voltage level is exceeded.

BACKGROUND OF THE INVENTION

At airports, pilots orient themselves during takeoff and while on the movement area by means of airport visual aids that are set in the pavement along the taxiways and/or runways. These airport visual aids must operate extremely reliably and must reliably guide the pilots particularly in the event of poor visibility conditions, for example, during periods of darkness or fog. If individual lamps of the airport lighting system fail, this failure must be quickly detected and corrected in order to guarantee safety. Because visual inspection would be time-intensive and expensive due to the large number of lamps, a detector circuit is typically provided for detecting defective lamps. The individual lamps are typically powered by means of individual supply transformers, wherein the detector circuit is allocated to the supply transformer.

For many years, conventional lamps, especially halogen lamps, have been the most cost-effective and most reliable light source for airport lighting systems. Detector circuits that have been tested and proven for many years are available on the market for such halogen lamps. For example, U.S. Pat. No. 3,061,828 describes such a circuit. The circuit makes use of the fact that when there is a defect in a halogen lamp, the transformer goes into a saturation state. The saturation state changes the amplitude and phase of the voltage. This change can be detected by the detector circuit and thus a defect or failure of the light source can be reliably determined.

The detector circuits known on the market are designed for halogen lamps. They cannot be used without additional components in modern visual aids with LED light sources, like those described, for example, in U.S. Pat. No. 7,654,720, because of their different behavior in the event of a defect. In light of this background, the published international patent application PCT/EP2012/059154 by this applicant discloses an adapter circuit by means of which, in the event of a defect, the behavior of an LED visual aid should approximate the known characteristics of a halogen lamp. Although this adapter circuit has been tested and proven in principle, errors in the fault detection can occur especially due to a residual current that also flows through the adapter circuit in the event of a fault. Moreover, when switched on after a fault state, this adapter circuit exhibits a delayed response. Thus, after being put in operation again, there will be a delay in detecting a defect that has not been corrected.

Consequently, the problem of the present invention is to disclose a modified adapter circuit that is designed for an LED airport visual aid, reliably detects a defect, and exhibits improved response when it is put in operation again.

SUMMARY OF THE INVENTION

To solve the problem, the invention is characterized in that the switch element is provided between the trigger circuit and the secondary side of the supply transformer and/or the trigger circuit is connected to the switch contact and to the switching circuit of the LED airport visual aid.

The special advantage of the invention consists in that, in the event of a fault, when the switch element is open no residual current flows through the secondary coil of the supply transformer and the evaluation circuit. The detector circuit allocated to the supply transformer finds exactly the same state that exists in the event of a fault in halogen lamps and thus functions reliably. Extensive field tests by the applicant have shown that the adapter circuit interacts without error with all of the detector circuits known to the applicant. Therefore, a single identical adapter circuit can always be used regardless of the detector circuit and in the event of a fault in the LED airport visual aid, this adapter circuit completely separates the switching circuit of this visual aid from the supply transformer and exactly simulates the behavior of halogen lamps. At the same time, the detector circuits known on the market can be used without any changes for monitoring LED airport visual aids.

The main idea of the invention is to allocate the switch element, instead of previously to the evaluation circuit, now on the secondary side of the supply transformer. In terms of the circuit, the switch element is now located between the secondary side of the supply transformer and the evaluation circuit. The evaluation circuit is connected directly to the switching circuit of the LED airport visual aid and indirectly via the switch element to the secondary side of the supply transformer.

An arbitrary switch element can be actuated by means of the trigger circuit. For example, a semiconductor switch element, in particular, a triac, thyristor, or MOSFET can be used to separate the secondary side of the transformer from the switching circuit of the LED airport visual aid.

According to one preferred embodiment of the invention, a bistable relay with at least one switch contact and with at least one relay coil is provided for actuating the switch contact. The switch contact is used as the switch element interacting with the trigger circuit and, in a closed state of the relay, makes the connection of the switching circuit of the LED airport visual aid to the supply transformer and, in an open state of the relay, breaks this connection. Advantageously, through the use of the bistable relay, a fault is simulated even in the deenergized state of the relay. In the event of a defect of the LED airport visual aid, a switch contact of the bistable relay opens and separates the switching circuit of the airport visual aid from the secondary side of the supply transformer. In an open state, the bipolar relay is thus in the fault state. Due to its structural design, the open state of the relay is formed as a stable open state that is maintained even if the relay is no longer energized. Likewise, a closed state of the relay is formed as a stable closed state during the normal operation of the LED airport visual aid.

The provision of the bistable relay realizes a kind of event memory in the adapter circuit. Independent of the energization state of the relay, the functional state of the LED airport visual aid can be directly detected on the switch state of the relay. If the relay—energized or deenergized—is in the open state, then a fault on the LED airport visual aid has been detected. Conversely, if the relay—energized or deenergized—is in the closed state, then the LED airport visual aid is in a standard operating state.

Another advantage of the use of the bistable relay is that, when the LED airport visual aid is put in operation again, the previous fault state is immediately simulated by the stable switch state of the relay. If the relay of the LED airport visual aid was out of operation and the bistable relay was in its open state, then when the visual aid is put in operation again, the relay is still in the open state. Thus, the fault state with respect to the voltage characteristics of the transformer can be detected immediately after being put in operation again. Reliable error detection is thus possible, in particular, within a time window of two seconds, as required on a stop bar.

According to one refinement of the invention, the trigger circuit has at least one rectifier diode connected to the switching circuit of the LED airport visual aid, preferably a rectifier bridge arrangement, and a filter arrangement for filtering the current and/or voltage of the rectifier diode or the rectifier bridge arrangement. The filter arrangement comprises, for example, one resistor and one capacitor connected to this resistor in series, wherein a relay coil is connected in parallel to the capacitor of the filter arrangement. Advantageously, in this way the current flowing through the relay coil is limited and simultaneously has low energy requirements.

According to one refinement of the invention, the bistable relay is constructed as a latching relay or as a locking relay or as a support relay. The relay is advantageously a relay that is produced economically in large quantities, has been adequately tested and proven, and functions reliably.

According to one refinement of the invention, the relay has a control input by means of which it can be reset into the closed state. Advantageously, after a defective LED airport visual aid has been repaired, the relay can be actuated once via the control state and set to the closed state. After being put in operation again, the LED airport visual aid is powered according to standard operation and a fault is no longer detected. Thus, the control state acts something like a state for writing over the adapter circuit's memory formed by the bistable relay.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

Figure 1:
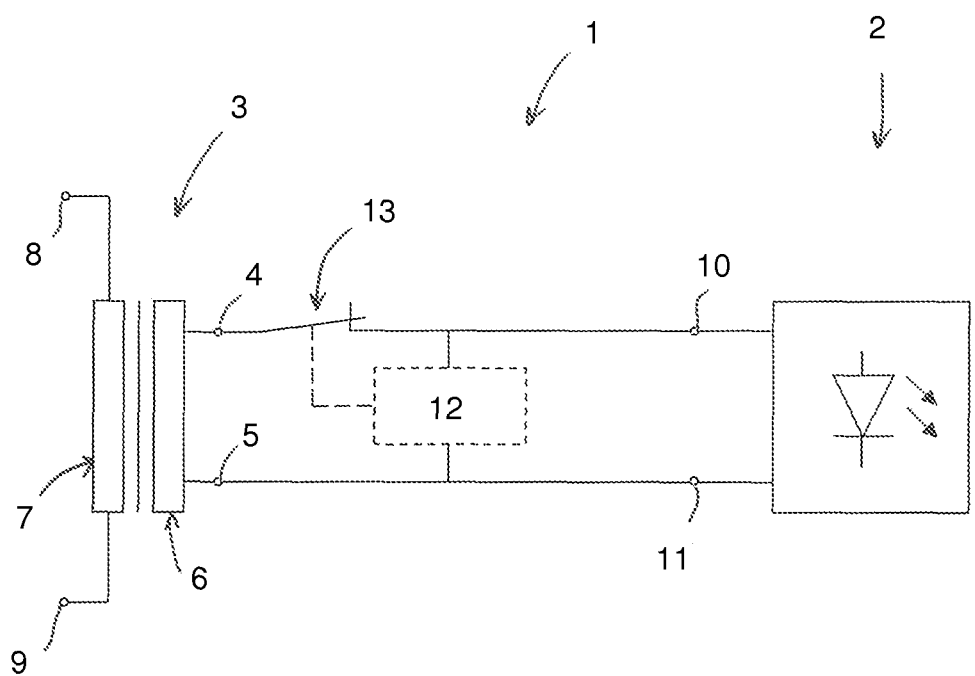
FIG. 1 an arrangement of the adapter circuit between the secondary side of a supply transformer and a switching circuit of an LED airport visual aid, FIG. 2 a first embodiment of the adapter circuit with a rectifier bridge arrangement, FIG. 3 a second embodiment of the adapter circuit with two switch contacts, and FIG. 4 an embodiment of an adapter with the adapter circuit.

According to FIG. 1, the adapter circuit 1 is provided between a switching circuit 2 of an airport visual aid equipped with an LED as the light source and a supply transformer 3. The adapter circuit 1 has two inputs 4, 5 by means of which the adapter circuit 1 is connected to a secondary side 6 of the supply transformer 3. The supply transformer 3 itself is connected to a primary side 7 by means of two connection terminals 8, 9 on a not-shown alternating-current power line. By means of two outputs 10, 11 of the adapter circuit 1, this circuit is connected to the switching circuit of the LED airport visual aid.

The adapter circuit 1 itself comprises a trigger circuit 12 and a switch element 13 that can be actuated by means of the trigger circuit 12. The switch element 13 is provided between the secondary side 6 of the supply transformer 3 on one side and the trigger circuit 12 on the other side. The trigger circuit 12 is located between the switch element 13 and the switching circuit 2 for the LED airport visual aid, wherein the trigger circuit 12 is connected indirectly via the switch element 13 to the secondary side 6 (secondary coil) of the supply transformer 3. If the switch element 13 is changed to an open state by the trigger circuit 12, the switching circuit 2 for the LED airport visual aid is separated from the supply transformer 3. In the open state of the switch element 13, no current flows through the secondary side 6 of the supply transformer 3. In particular, in the open state of the switch element 13, no residual current flows through the trigger circuit 12. In a closed state of the switch element 13, the supply transformer 3 and the switching circuit 2 for the LED airport visual aid are connected.

Figure 2:
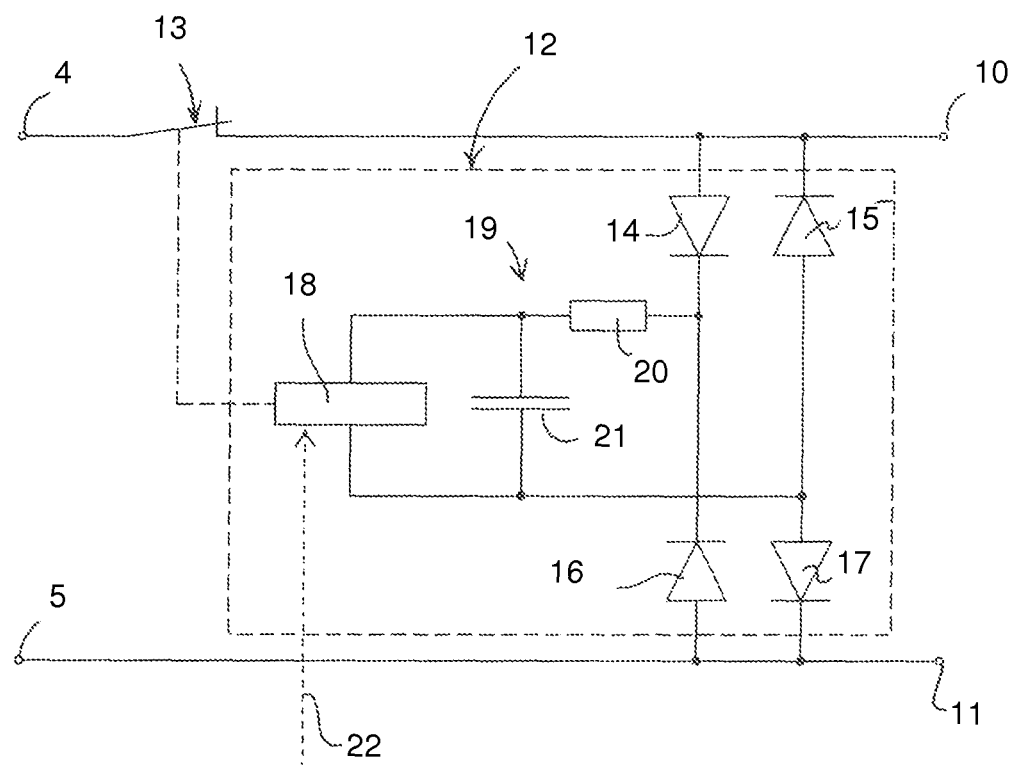

FIG. 2 shows a detailed view of the adapter circuit 1 according to FIG. 1. The trigger circuit 12 comprises overall four rectifier diodes 14, 15, 16, 17 that are connected in a kind of rectifier bridge arrangement. A relay 18 is energized by the rectifier bridge arrangement. A filter arrangement 19 with a resistor 20 and a capacitor 21 that is connected in parallel with the relay 18 is located between the relay 18 and the rectifier bridge arrangement.

The relay 18 is formed like a bistable relay, in particular, like a support relay, locking relay, or latching relay. The switch element 13 is preferably formed by a switch contact of the relay 18 and is actuated, i.e., switched, by the energization of a relay coil. A separate switch element, in particular, a semiconductor switch element such as a triac, a thyristor, or a MOSFET, can be eliminated in this embodiment. The use of the bistable relay 18 ensures that the switch state of the relay 18 remains even in the deenergized state.

If a voltage applied to the relay 18 exceeds a specified voltage level (trigger voltage), the switch element 13 is switched to an open state and the supply transformer 3 separates from the switching circuit 2 of the LED airport visual aid. Below this voltage level, the switch element 13 is in the closed state and the supply transformer 3 is connected to the switching circuit 2 for the LED airport visual aid.

The relay 18 has a control input 22. Because the relay 18, as a bistable relay 18, also keeps its switch state even in the deenergized state and thus acts as a state memory for the adapter circuit 1, the switch state of the relay 18 can be changed manually and, in particular, reset to the closed state by means of the control input 22. This is to be performed, for example, when the LED airport visual aid is serviced after a defect or a fault state with an open relay contact 13 and the bistable relay is to be switched manually to the closed state before putting the LED airport visual aid in operation again. For example, this manual relay actuation in the scope of the maintenance work is performed locally on site directly on the adapter circuit 1 provided adjacent to the switching circuit 2 of the LED airport visual aid.

Figure 3:
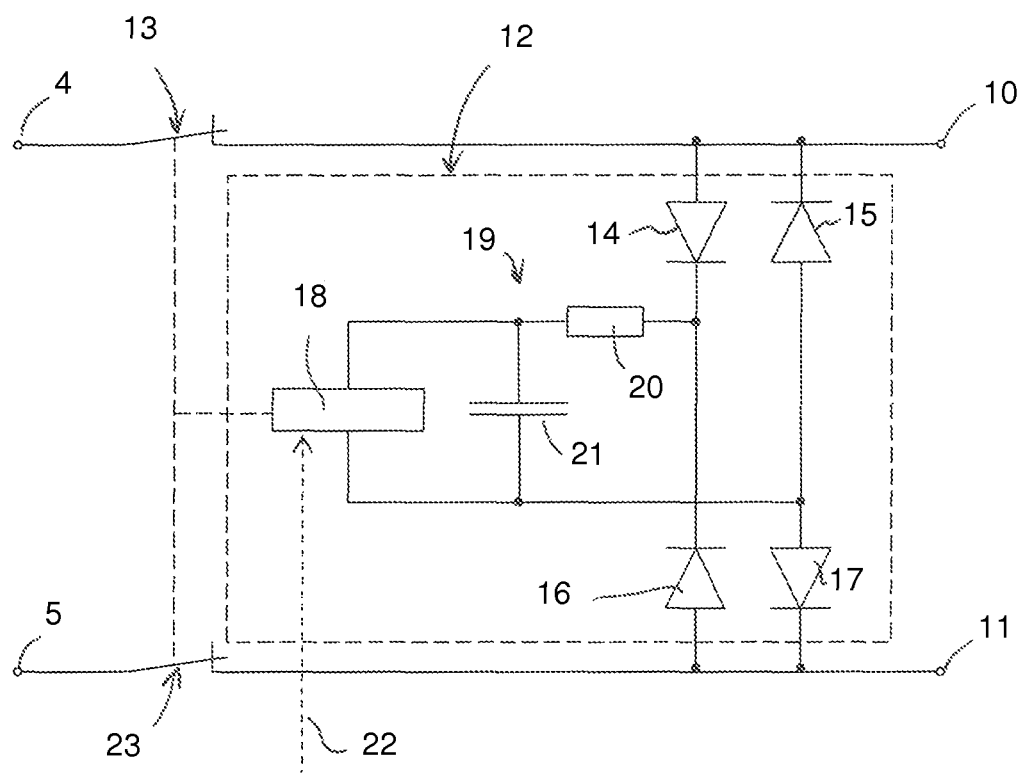

According to one alternative embodiment of the invention according to FIG. 3, the bistable relay 18 is formed as a relay 18 with doubled switch contacts 13, 23 (switch element 13, 23). The double-acting relay with the two switch contacts 13, 23 is provided so that both inputs 4, 5 of the adapter circuit 1 are separated from the corresponding outputs 10, 11. In this respect, the switch contacts 13, 23 are two cables connecting the inputs 4, 5 to the outputs 10, 11. According to the invention, at least one switch element 13, 23 is provided between the supply transformer 3 and the trigger circuit 12. In the present case, both switch elements 13, 23 of the trigger circuit 12 are arranged between the trigger circuit 12 and the supply transformer 3 on a side facing away from the switching circuit 2 for the LED airport visual aid.

Identical components and component functions are designated by identical reference symbols.

Figure 4:
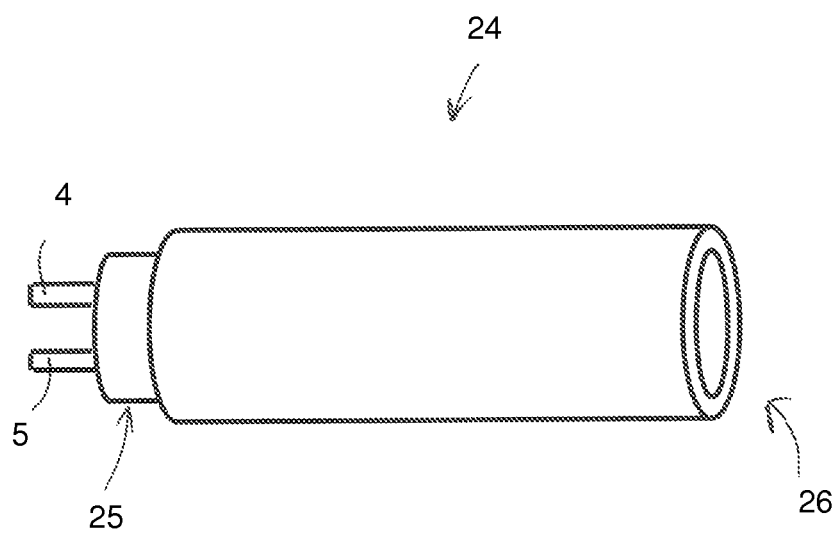

FIG. 4 shows an adapter 24 with a connector 25 and a coupling 26. The connector 25 and the coupling 26 are formed, for example, as an L-823 connector and L-823 coupling, respectively. The adapter circuit 1 is installed in the adapter 24, wherein two contact fingers of the connector 25 are formed as inputs 4, 5 of the adapter circuit 1 and can be connected to the secondary side 6 of the supply transformer 3. The adapter 24 is spatially adjacent, in particular, to the LED airport visual aid and connected to the switching circuit 2 via the coupling.

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

LIST OF REFERENCE SYMBOLS

1 Adapter circuit
2 Switching circuit
3 Supply transformer
4 Input
5 Input
6 Secondary side
7 Primary side
8 Connection terminal
9 Connection terminal
10 Output
11 Output
12 Trigger circuit
13 Switch contact (switch element)
14 Rectifier diode
15 Rectifier diode
16 Rectifier diode
17 Rectifier diode
18 Relay
19 Filter arrangement
20 Resistor
21 Capacitor
22 Control input
23 Switch contact (switch element)
24 Adapter
25 Connector
26 Coupling

The invention claimed is:

1. An adapter circuit for connecting a switching circuit of an airport visual aid that is equipped with an LED as a light source and a secondary-side coil of a supply transformer, said adapter circuit comprising:
at least one switch element for selectively making or breaking the connection;
at least one trigger circuit for actuating the switch element when a specified voltage level is exceeded;
wherein the switch element is at least one of:
located between the trigger circuit and the secondary-side coil of the supply transformer and
connected to the trigger circuit, and wherein the trigger circuit is also connected to the switching circuit of the LED airport visual aid,
wherein no current flows through the at least one trigger circuit when said at least one switch element is in an open state to break the connection.

2. The adapter circuit according to claim 1, wherein a bistable relay with at least one switch contact and with a relay coil is provided for actuating the switch contact, wherein the switch contact acts as the switch element interacting with the trigger circuit, and wherein the connection of the switching circuit of the airport visual aid to the supply transformer is made in a closed state of the relay or is broken in an open state of the relay.

3. The adapter circuit according to claim 1, wherein the trigger circuit comprises at least one rectifier diode connected to the switching circuit of the LED airport visual aid and a filter arrangement for filtering the current and voltage of the rectifier diode.

4. The adapter circuit according to claim 2, wherein the bistable relay is constructed as a latching relay or as a locking relay or as a support relay.

5. The adapter circuit according to claim 2, wherein the bistable relay has a control input for resetting the relay to the closed state.

6. The adapter circuit according to claim 2, wherein the secondary-side coil of the supply transformer and the switching circuit of the LED airport visual aid are connected in an electrically conductive way via two cables, and further including two switch contacts, wherein one switch contact is allocated to each cable and wherein the two switch contacts can be actuated by means of a common relay coil.

7. The adapter circuit according to claim 2, wherein at least one of the trigger circuit and the bistable relay are installed in a common housing with the switching circuit for the LED airport visual aid.

8. The adapter circuit according to claim 1, wherein a filter arrangement includes a resistor and a capacitor connected in series with the resistor.

9. The adapter circuit according to claim 8, wherein a relay coil is connected in parallel with the capacitor of the filter arrangement.

* * * * *